United States Patent [19]

Amacher et al.

[11] Patent Number: 4,751,661

[45] Date of Patent: * Jun. 14, 1988

[54] AUTOMATIC ZERO BALANCING OF A WEIGHING APPARATUS

[75] Inventors: Gene L. Amacher, Cambridge; Gene R. Mathes, Zanesville; John E. Paugstat, Salesville, all of Ohio

[73] Assignee: NCR Corporation, Dayton, Ohio

[ * ] Notice: The portion of the term of this patent subsequent to Apr. 28, 2004 has been disclaimed.

[21] Appl. No.: 868,926

[22] Filed: May 27, 1986

[51] Int. Cl.⁴ ................... G06F 15/20; G01G 19/04
[52] U.S. Cl. .................................. 364/567; 73/1 R; 177/3; 177/25; 364/466; 364/571
[58] Field of Search ............... 364/466, 567, 571, 575; 177/1, 3, 25.13, 25.19; 73/1 R; 340/666

[56] References Cited

U.S. PATENT DOCUMENTS

| | | |
|---|---|---|
| 3,665,169 | 5/1972 | Henderson et al. |
| 3,860,802 | 1/1975 | Knothe et al. |
| 4,080,657 | 3/1978 | Caldicott et al. .................... 364/567 |
| 4,241,407 | 12/1980 | Sookikian et al. .................... 364/567 |
| 4,316,516 | 2/1982 | Kupper ................................. 177/25 |
| 4,316,517 | 2/1982 | Jonath .................................. 177/25 |
| 4,325,441 | 4/1982 | Nakatani et al. ..................... 177/25 |
| 4,375,838 | 3/1983 | Yano et al. ........................... 177/25 |
| 4,423,486 | 12/1983 | Berner .................................. 364/466 |
| 4,442,911 | 4/1984 | Fukuda ................................. 177/25 |
| 4,509,608 | 4/1985 | Hikita .................................. 177/25 |
| 4,549,620 | 10/1985 | Dee et al. ............................ 177/25 |
| 4,656,599 | 4/1987 | Knothe et al. ....................... 364/567 |
| 4,660,663 | 4/1987 | Amacher et al. .................... 364/567 |
| 4,661,920 | 4/1987 | Haze .................................... 364/567 |

Primary Examiner—Parshotam S. Lall
Assistant Examiner—Kevin J. Teska
Attorney, Agent, or Firm—Wilbert Hawk, Jr.; Albert L. Sessler, Jr.; Richard W. Lavin

[57] ABSTRACT

A method for automatically zero balancing an electronic scale includes disabling the display from displaying a "Scale Ready" logo, taking a number of readings from the scale when no weight is placed on the scale, obtaining an average reading for a zero weight condition of the scale by dividing the sum of the readings by the number of readings taken, detecting when two consecutive average readings are within a first predetermined limit, enabling the display to display the "Scale Ready" logo indicating the scale is ready for a weighing operation, taking a number of readings from the scale in response to the displaying the scale ready logo, blanking the display when the readings taken are not within a predetermined value of the zero balance readings, and removing the scale lid from the scale and cleaning the scale to remove dirt or other impediments from the scale in response to the blanking of the display.

7 Claims, 11 Drawing Sheets

AUTOMATIC ZERO BALANCING OF A WEIGHING APPARATUS

CROSS-REFERENCE TO RELATED APPLICATIONS

Method of Calibrating a Weighing Apparatus Within an Enclosure, U.S. Pat. No. 4,660,663 issued Apr. 28, 1987, invented by Gene L. Amacher, Gene R. Mathes and John F. Paugstat, assigned to the NCR Corporation.

Method of Calibrating a Weighing Apparatus., co-pending application Ser. No. 868,925, filed on May 27, 1986, invented by Gene L. Amacher, Gene R. Mathes and John F. Paugstat, assigned to the NCR Corporation.

Method of Fast Weighing, co-pending application Ser. No. 867,650, filed May 27, 1986, now U.S. Pat. No. 4,715,457, invented by Gene L. Amacher, Gene R. Mathes and John F. Paugstat, assigned to the NCR Corporation.

Method for Controlling Terminal Display Indication, co-pending application Ser. No. 867,658, filed May 27, 1986 now U.S. Pat. No. 4,716,281, invented by Gene L. Amacher, Gene R. Mathes and John F. Paugstat, assigned to the NCR Corporation.

BACKGROUND OF THE INVENTION

The present invention is directed to weight measuring apparatus and more particularly to a method for automatically zero balancing a weighing scale so as to meet Federal standards concerning the accuracy of the scale for measuring weights placed on the scale.

Weighing scales are found in supermarkets or the like for weighing produce or other merchandise items and must meet stringent requirements as to performance and cost. The scales must be accurate enough to satisfy public weights and measures authorities. These requirements are usually met at the time the scale is manufactured by means of a calibrating procedure. As part of these requirements, the scale must display a predetermined reference value, normally zero, when no merchandise item is being weighed so that the change in the output display produced by a merchandise item being weighed will accurately represent the true weight of the item. Through use, the zero reference of the scale may change due to the following causes: the accumulation of foreign matter on the scale platform or its supports; a change in the position of the scale platform; the effect of temperature on the electronic components; the offset due to aging of the electrical components; and hystersis, especially after weighing of a heavy object. Prior methods for zero balancing a scale have included the manual setting of control linkages or the like to zero balance the scale. This procedure was slow and cumbersome, thereby detracting from the usefulness of the scale in check-out operations.

It is therefore a principal object of this invention to provide a method for zero balancing a weighing scale which is simple in its operation and can be accomplished in a minimum amount of time.

SUMMARY OF THE INVENTION

This and other objects of the invention are fulfilled by connecting a microprocessor to a display in the scale in which the microprocessor will disable the display from displaying a scale ready logo, and take a number of readings from the scale in response to the removal of the weight on the scale. The microprocessor will then obtain an average reading for a zero weight condition of the scale by dividing the sum of the readings by the number of readings taken. This procedure is repeated until two consecutive average readings are within a first predetermined limit. The processor then enables the display to display the scale ready logo, indicating that the scale is ready. If the average readings are within a second predetermined limit, the display is blanked, requiring the operator to remove the scale lid from the scale and clean the scale to remove dirt or other impediments from the scale. The microprocessor will then repeat the readings until the readings are within the first predetermined limit.

BRIEF DESCRIPTION OF THE DRAWINGS

The foregoing and other objects, advantages, and features of the invention will be described in greater detail, taken in conjunction with the drawings, wherein.

DESCRIPTION OF THE PREFERRED EMBODIMENT

Figure 1:
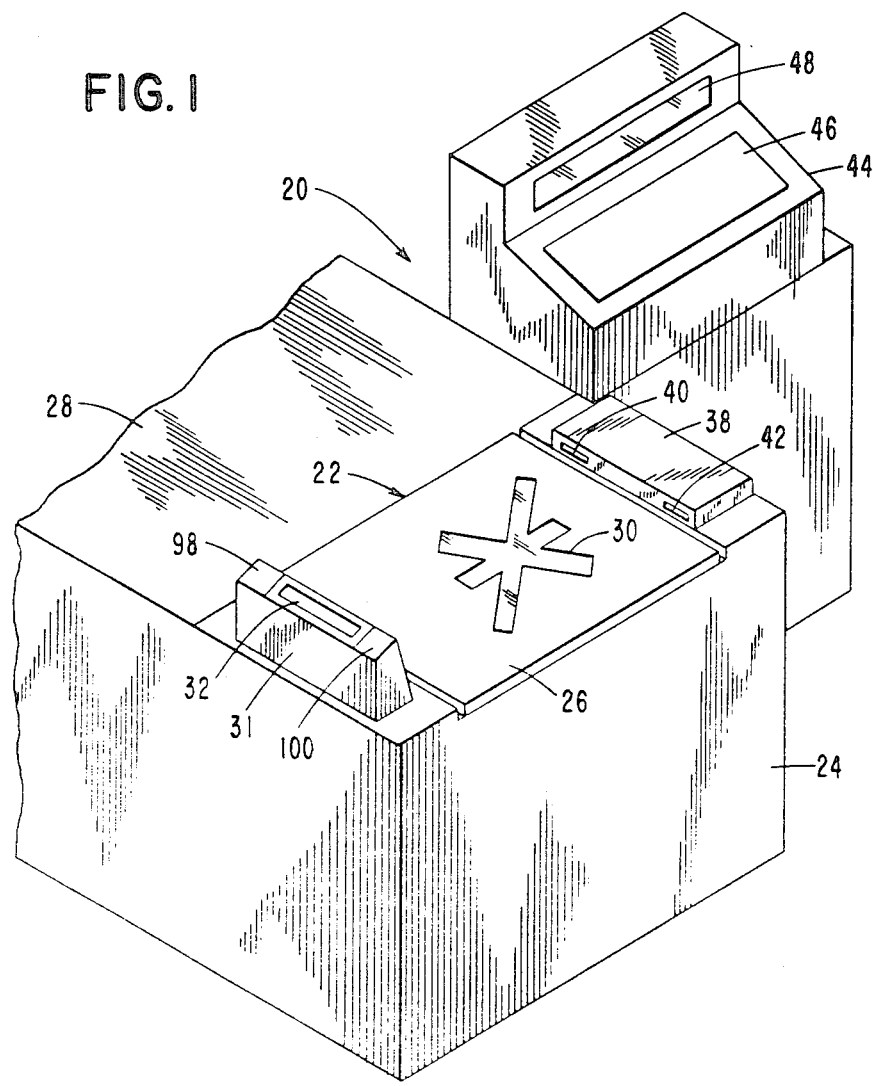
FIG. 1 is a perspective view of a check-out system which includes a scale for weighing purchased merchandise items.

Referring now to FIG. 1, there is shown a perspective view of a merchandise check-out system generally indicated by the numeral 20 in which a scale 22 is utilized to weigh a purchased item. The scale is located within a check-out counter 24 and includes a scale lid or load plate 26 movably mounted flush with the top surface 28 of the check-out counter 24. The scale lid 26 includes an aperture 30 through which scanning beams from a scanner assembly 36 (FIG. 2) mounted beneath the scale within the check-out counter are projected for scanning a bar code label (not shown) on a merchandise item positioned on the scale lid 26 in a manner that is well known in the art. Mounted adjacent the scale lid 26 on the surface 28 of the check-out counter 24 is a housing member 31 in which is located a customer display 32 which displays the price of the merchandise item scanned and also the weight of the item as the result of a weighing operation. Located adjacent on either side of the display 32 within the housing 31 are a pair of signal lights 98 and 100, one red and one green, which are operated to indicate whether a weighing operation or a scanning operation was successful or not. Opposite the housing 31 on the surface 28 of the counter 24, is a housing 38 in which is located a pair of photoelectric cells 40 and 42 which detect the entrance and the exit of the merchandise item on the lid 26. A pair of light emitting diodes (not shown) located in the housing member 31 directs light beams at the cells 40 and 42 in a manner that is well known in the art. Mounted adjacent the check-out counter 24 is a data terminal device for processing the sales transaction which includes a keyboard 46 and a display 48. The display 32 is an alphanumeric LCD display and can be operated automatically or by the manual operation of a key on the keyboard 46.

Figure 2:
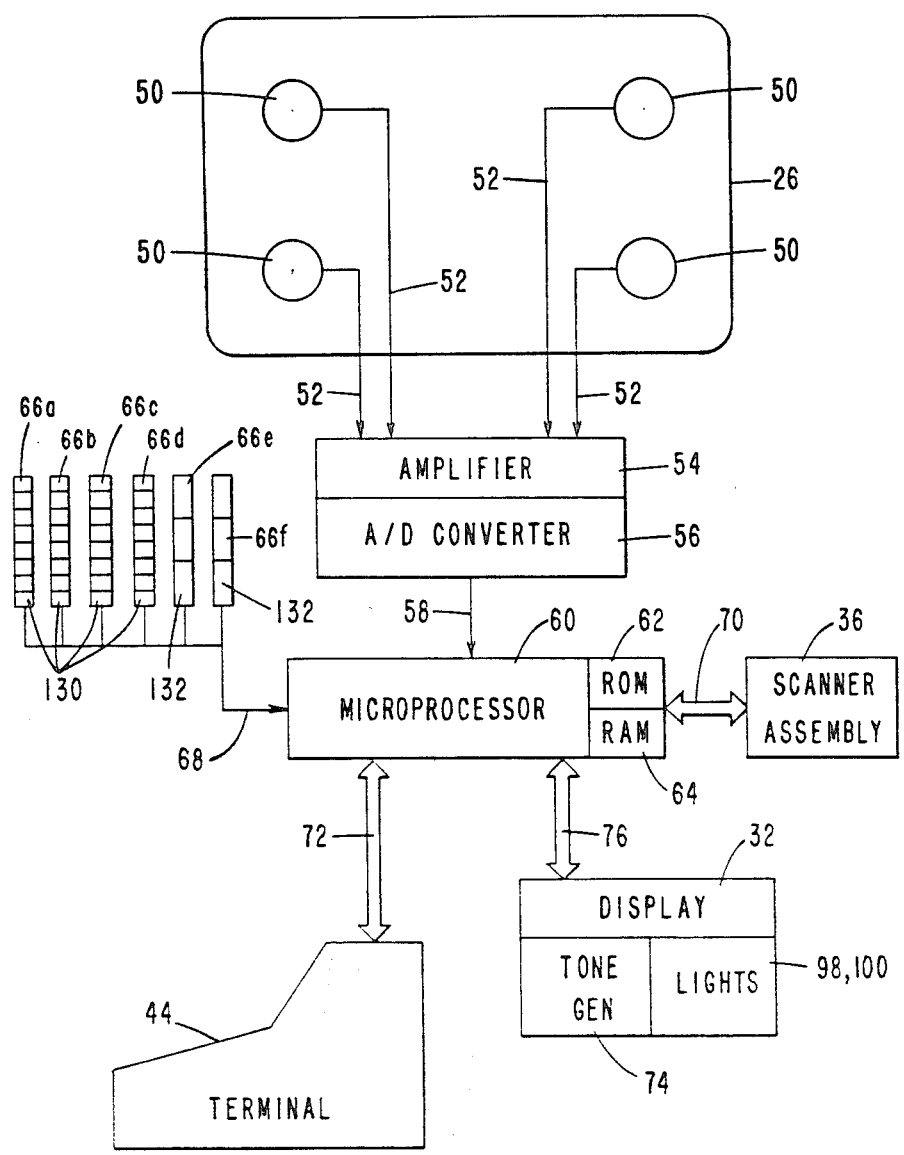
FIG. 2 is a schematic representation of the check-out system of FIG. 1 in which the scale microprocessor is used in the zero balancing of the scale.
Figure 4:
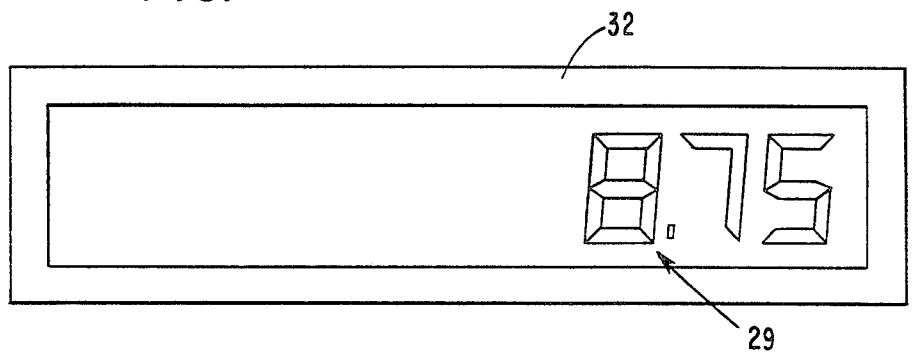
FIG. 4 is a plan view of the customer display showing the display of price information of a scanned merchandise item.

Referring now to FIG. 2, there is shown a schematic representation of the check-out system (FIG. 1) in which the scale 22 includes four load cells 50 secured to the scale lid 26 and which cells provide output analog signals over lines 52 to an amplifier 54 in response to the placing of a weighted item on the lid 26. The amplified analog signals are then transmitted to a A/D converter 56 which outputs digital signals over line 58 to a microprocessor 60. The microprocessor 60 includes a ROM memory unit 62 in which is stored the program for zero balancing the scale 22 and a RAM memory unit 64 in which data used for zero balancing the scale is stored, as will be described more fully hereinafter. The microprocessor 60 is connected to six banks of switches 66a–66f inclusive over cable 68, to the scanner assembly 36 over bus 70, to the terminal 44, the display 32, the signal lights 34 and a tone generator 74 over bus 76. As fully disclosed in the previously cited co-pending application, Ser. No. 868,925, the switch banks 66a and 66b are set to store the output of the load cells when a first weight is positioned on the scale while banks 66c and 66d store the results of a second weight positioned on the scale. The microprocessor 60 monitors the operation of the scanner assembly 36 over bus 70. When the scanner is in operation, the microprocessor 60 controls the display 32 to display the item price or total sale indicated by the numeral 29 in FIG. 4 in response to data received from the terminal 44. The microprocessor 60 will also control the display 32 to display the item weight indicated by the numeral 35 in FIG. 5 in response to a weighing operation and to display a "Scale Ready" logo indicated by the numeral 33 in FIG. 5 to indicate that the scale has been zero balanced in a manner to be described more fully hereinafter. The microprocessor 60 also controls the signal lights 98, 100 and the tone generator 74 in response to the operation of the scanner and the scale, indicating a valid or an invalid operation, as will be explained more fully hereinafter.

Figure 3:
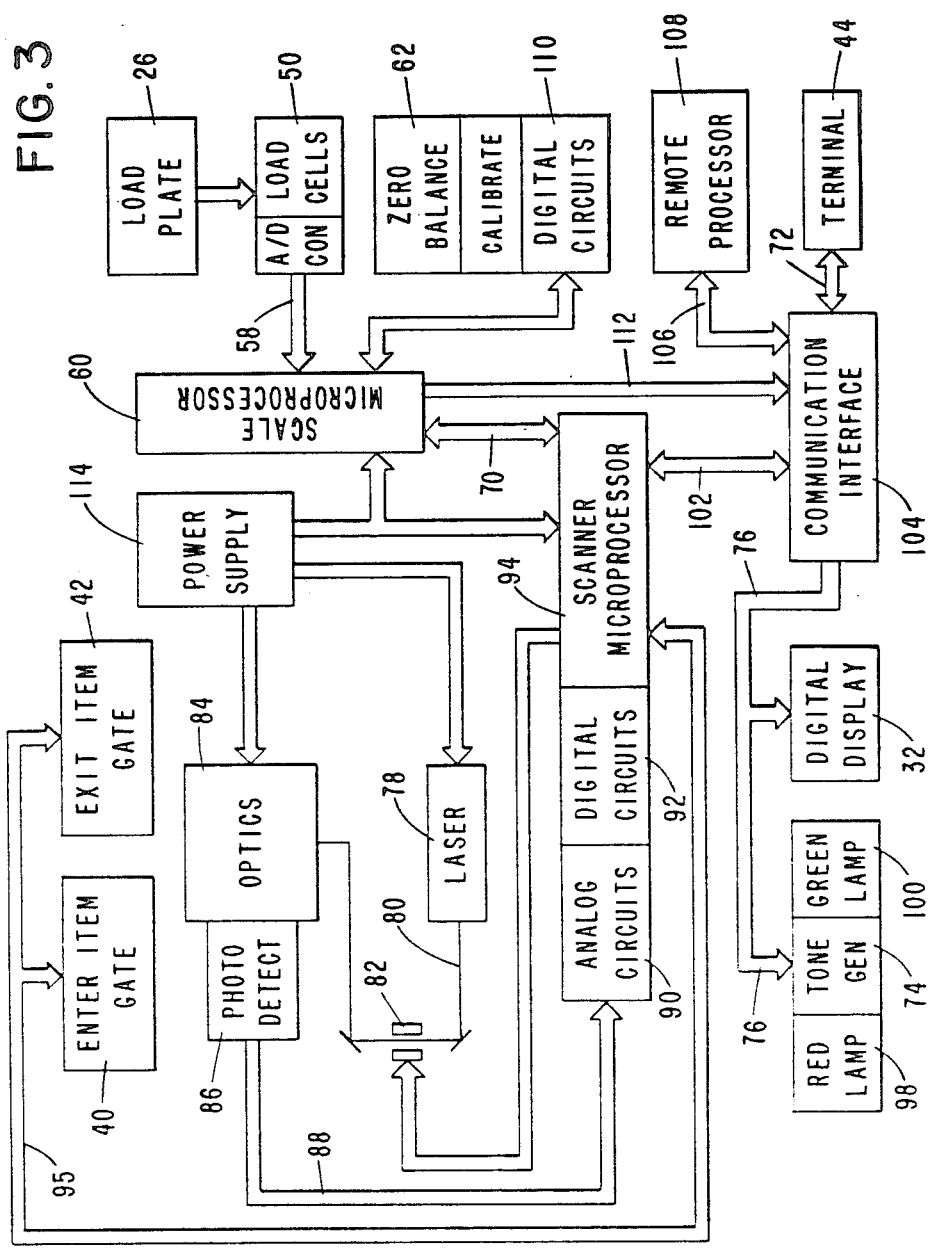
FIG. 3 is a functional block diagram of the check-out system of FIG. 1.

Referring now to FIG. 3, there is disclosed a more detailed functional block diagram of the checkout system 20 in which the scanner assembly 36 (FIG. 2) includes a laser light 78 which outputs a light beam 80 through a shutter assembly 82 to a rotating optical assembly 84 which in turn directs the reflected light beam through the aperture 30 (FIG. 1) and the scale lid 26. The scanning light beam scans the bar code label on a merchandise item positioned on the lid 26. The light beam is reflected from the bar code label back through the aperture 32 to a photodetector 86 which outputs an analog signal representing the coded data read over the bus 88 to the analog circuit section 90 where the signals are amplified and transferred to the digital circuit section 92. The digital circuit section 92 converts the analog signals to digital data signals. The data signals are then transferred to a scanner microprocessor 94. The microprocessor 94 also receives signals over bus 95 from the enter item gate 40 and the exit item gate 42 indicating the presence of a merchandise item. In response to receiving the signals from the item gate 40, the microprocessor 94 operates the shutter assembly 82 allowing the light beam from the laser light 78 to scan the merchandise item. A signal from the exit item gate 42 turns off the shutter assembly.

The microprocessor 94, using the data received, determines whether a good or bad read operation has occurred. If a bad operation has occurred, the microprocessor 94 will output a control signal over bus 70 to the microprocessor 60 which operates the red lamp 98 by transmitting the appropriate signals over bus 112, a communication interface 104 and bus 76 to the red lamp 98. The red lamp 98 indicates to the operator that the merchandise item should be rescanned. If a good read has occurred, the green lamp 100 is illuminated and the tone generator 74 is operated to output a sound signal indicating to the operator that a good read has occurred. For a complete disclosure of the operation of the item gates 40, 42 and the lamps 98, 100, reference should be made to U.S. Pat. No. 4,086,476 issued to R. J. King and assigned to the assignee of the present application.

The data signals received by the microprocessor 94 identify the merchandise item being scanned. This information is transmitted over bus 102 to the communication interface 104 which transfers the data over bus 106 to a remote processor 108. The processor 108 using this data retrieves the price of the item from a price look-up table (not shown) located within the processor and transmits the price of the item to the microprocessor 94 through the interface 104. The price of the item is then displayed in the customer digital display 32 and the display 48 (FIG. 1) in the terminal 44.

The scale 22 includes the load plate 26 (FIG. 1), the load cells 50 (FIG. 2) the microprocessor 60, the ROM memory unit 62 in which is stored the programs for zero balancing and calibrating the scale, and a digital circuit section 110 by which the programs and the memory units 62 are interfaced with the microprocessor 60. Power is supplied to the system by the power supply 114.

Figure 5:
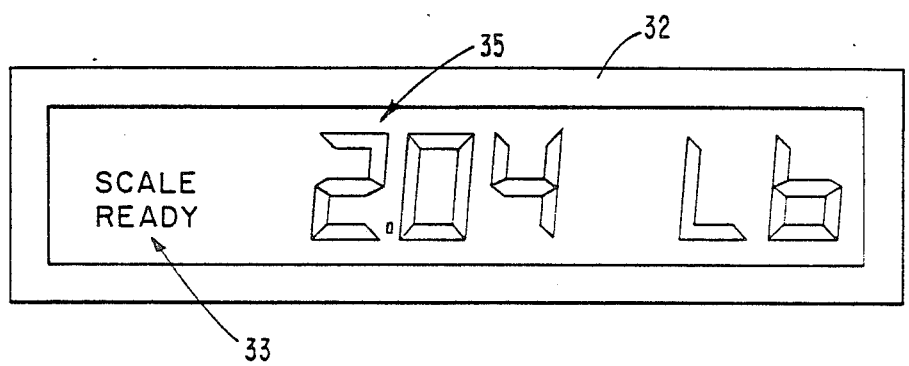
FIG. 5 is a plan view of the customer display showing the display of the weight of a purchased item and the scale ready logo.

When a scale operation is required, the operator will place the item to be weighed on the load plate 26 (FIG. 2) which transfers the load to the load cells 50. The cells will output analog signals to the amplifier 54 (FIG. 2), the A/D converter 56 (FIGS. 2 and 3) and to the microprocessor 60. The microprocessor 60 computes the weight and actuates the digital display 32 to display the weight 35 (FIG. 5). The weight data is also transmitted over bus 112 to the communication interface 104 which transfers the data to the terminal 44 over bus 72. The terminal obtains the price per pound data from the remote processor 108 and computes the item price 29 (FIG. 4), prints the item price on the customer receipt, displays the item price in the terminal display 48 (FIG. 1) and transmits the item price data to the scanner microprocessor 94 which displays a price in the customer digital display 32. The microprocessor 94 will operate the green lamp 100 and tone generator 74 if the operation is a good weighing operation and the red lamp 98 if it is a bad weighing operation.

Figure 6:
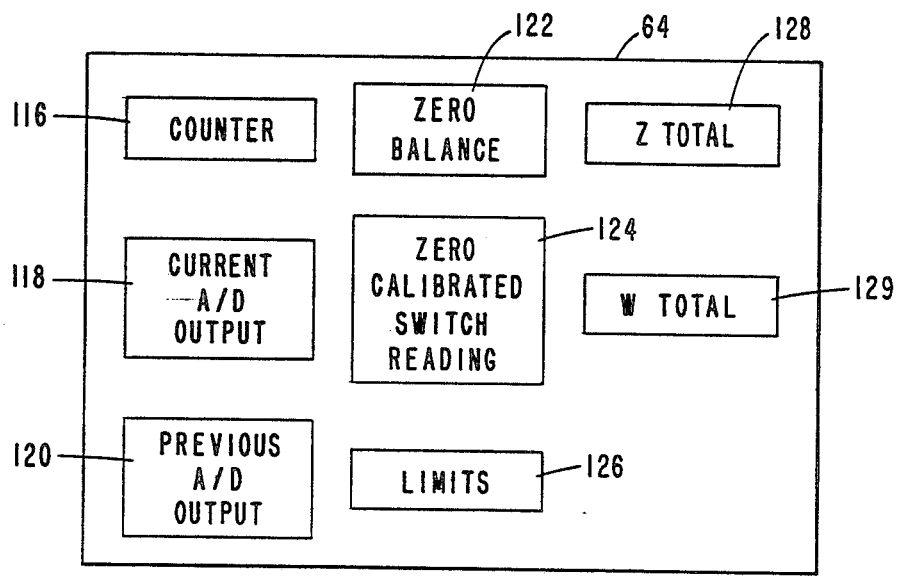
FIG. 6 is a block diagram of the RAM memory unit showing the memory locations of the storage registers associated with the zero balancing procedure.

Referring now to FIG. 6, there is disclosed a block diagram of the RAM memory unit 64 showing the major items of information storage registers used in the zero balancing operation. Included is a counter register 116 for outputting a plurality of consecutive counts, a current register 118 for storing the current output reading of the A/D converter 56 (FIG. 2), a previous register 120 for storing the previous A/D converter output reading, a register 122 for storing the zero balance readings, a storage register 124 for storing the readings of the zero calibration switches 130 (FIG. 2) in the switch banks 66c and 66d, a register 126 for storing the limits used in zero balancing the scale and two storage registers 128 and 129 for storing miscellaneous totals.

Figure 7:
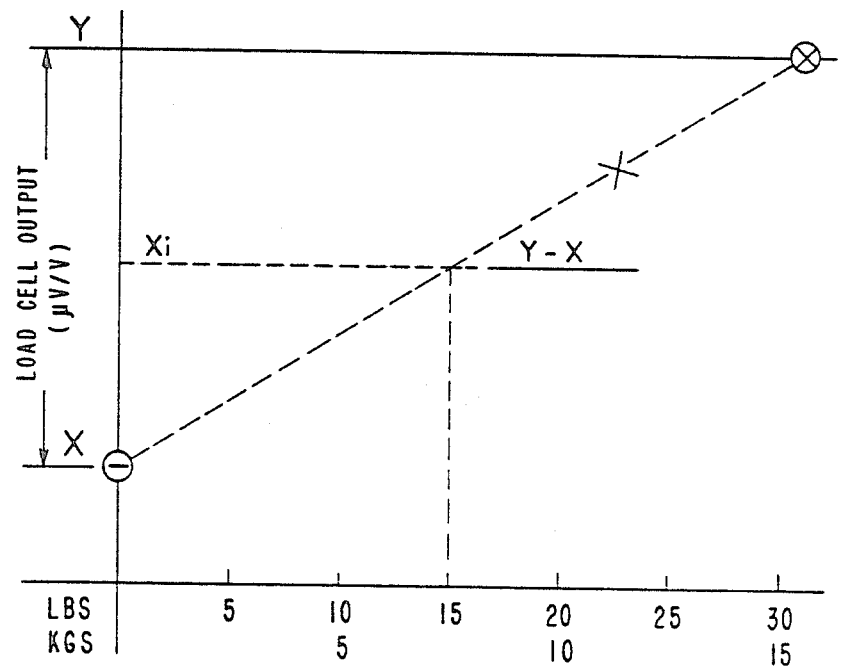
FIG. 7 is a graph illustrating the output of the load cells of the scale in accordance with the weight placed on the scale.

Referring now to FIG. 7, there is shows a graph illustrating the output of the load cells of the scale in microvolts/volts in accordance with the weight in pounds or kilograms placed on the scale. As shown, the output is a straight line relationship with the weights applied. In the diagram, X represents the recorded output for 0 lbs., Y the recorded output for 30 lbs. or 15 Kgr. and Xi the recorded output for a given weight with the net weight represented by the equation Xi-X/Y-X.

Figure 8:
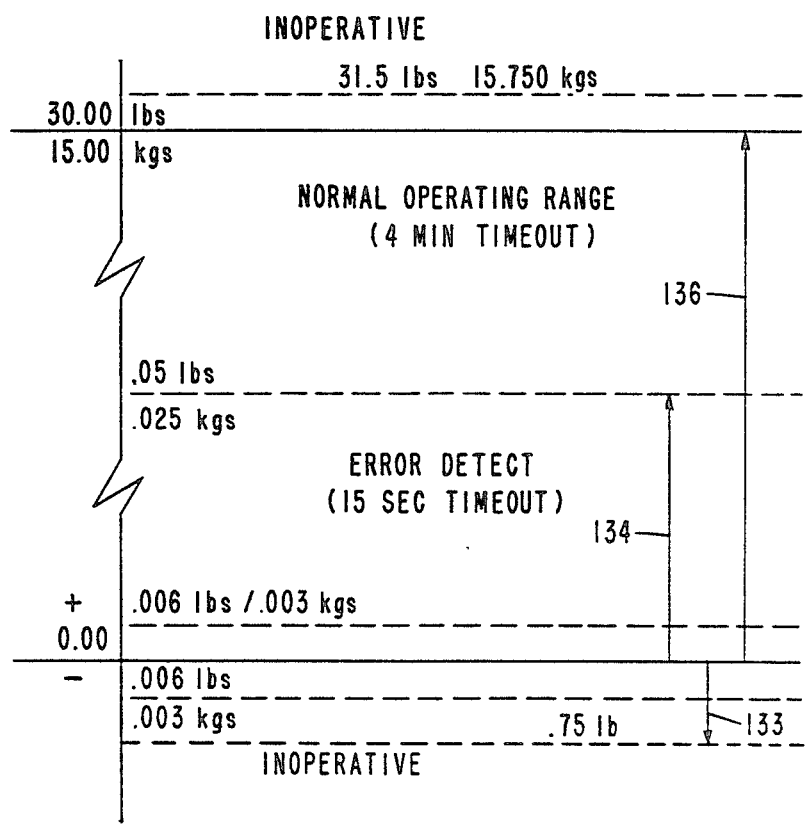
FIG. 8 is a schematic representation of the load limits that may be applied to the scale.

Referring now to FIG. 8, there is shown a schematic representation of the weight limits for a normal weighing operation. The automatic zero balance operation occurs when the scale at rest is within plus or minus 0.006 lbs. of the zero reference scale readings. Because the scale in the present embodiment is located within the check-out counter 24 (FIG. 1) and shares the scanner operation, extra precautions, beyond normal scale measures, are taken to ensure an accurate zero balance. For example, spilled liquids, food particles, human intervention, "sticky" scales, temperature, etc. associated with the scale and scanner operation can affect the zero balance status and related scale accuracy. As will be described more fully hereinafter, when the scale indicates an output of less than 0.006 lbs. when no weight is applied to the scale, tne automatic zero balancing operation requires that the scale lid be removed and the scale cleaned of the debris which has caused the scale reading. The removal of the scale lid 26 (FIG. 1) will drop the output reading of the load cells 50 (FIG. 2) to a level below −0.75 lbs. as indicated by line 133, resulting in a reset operation of the system. If the display indicates a reading between 0.006 and 0.05 lbs. after a fifteen second time out as indicated by line 134, the scale is in a disabled condition requiring a reset operation to occur as set out above. If a weight of up to thirty lbs., as indicated by line 136, is left on the scale for more than four minutes, the scale is disabled and a reset operation is required to return the scale to its normal operating range of plus or minus 0.006 lbs.

Figures 9, 10A:
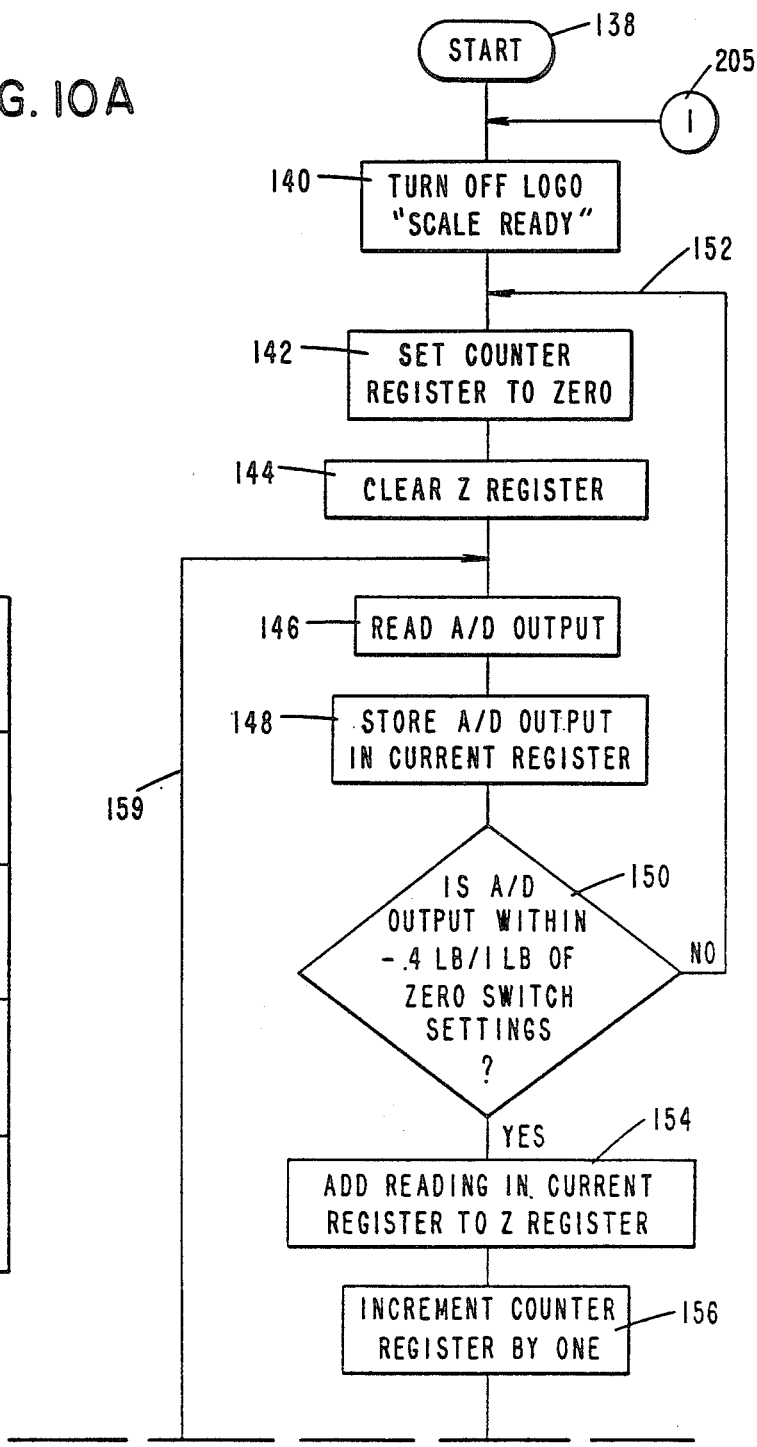
FIG. 9 is a diagram showing how FIGS. 10A–10E inclusive are assembled.
FIGS. 10A–10E inclusive are flow charts illustrating diagrammatically the steps of the zero balancing operation of the present invention.

Referring now to FIGS. 10A–10E inclusive, taken together, there is shown a flow chart of the automatic zero balancing operation, FIG. 9 shows the manner in which FIGS. 10A–10E inclusive should be assembled. The operation is started (block 138) (FIG. 10A) at the time power is applied to the system or when a reset operation is to occur. As fully described in the previous cited co-pending application, Ser. No. 868,925 filed 5/27/86, the switches 130 (FIG. 2) in the switch banks 66a and 66b have been set to store a 16 bit binary value representing the scale output value for a weight of 20 lbs. In a similar manner, the switches 130 in switch banks 66c and 66d store the value of 0 lbs. In response to the application of power to the system, the microprocessor 60 (FIGS. 2 and 3) turns off the "Scale Ready" logo 33 (FIG. 5) (block 140) in the display 32 and sets the counter register 116 (FIG. 6) (block 142) to zero. The microprocessor then clears the Z register 128 (FIG. 6) (block 144) reads the output of the A/D converter 56 (FIG. 2) (block 146) and stores that reading in the current register 118 (block 148). The microprocessor then checks to see if the current reading is within the limits of −0.4 lbs. to 1 lb. (block 150) of the zero reading stored in the setting of the switches 130 (FIG. 2) in the zero switch banks 66c and 66d. The limits are obtained from the limit register 126 (FIG. 6). If the A/D converter reading is not within those limits, the microprocessor will return over path 152 and repeat the steps by setting the counter register 116 to zero until the readings are within those limits, indicating that the scale has stablized with no weight on the scale lid.

Figure 10B:
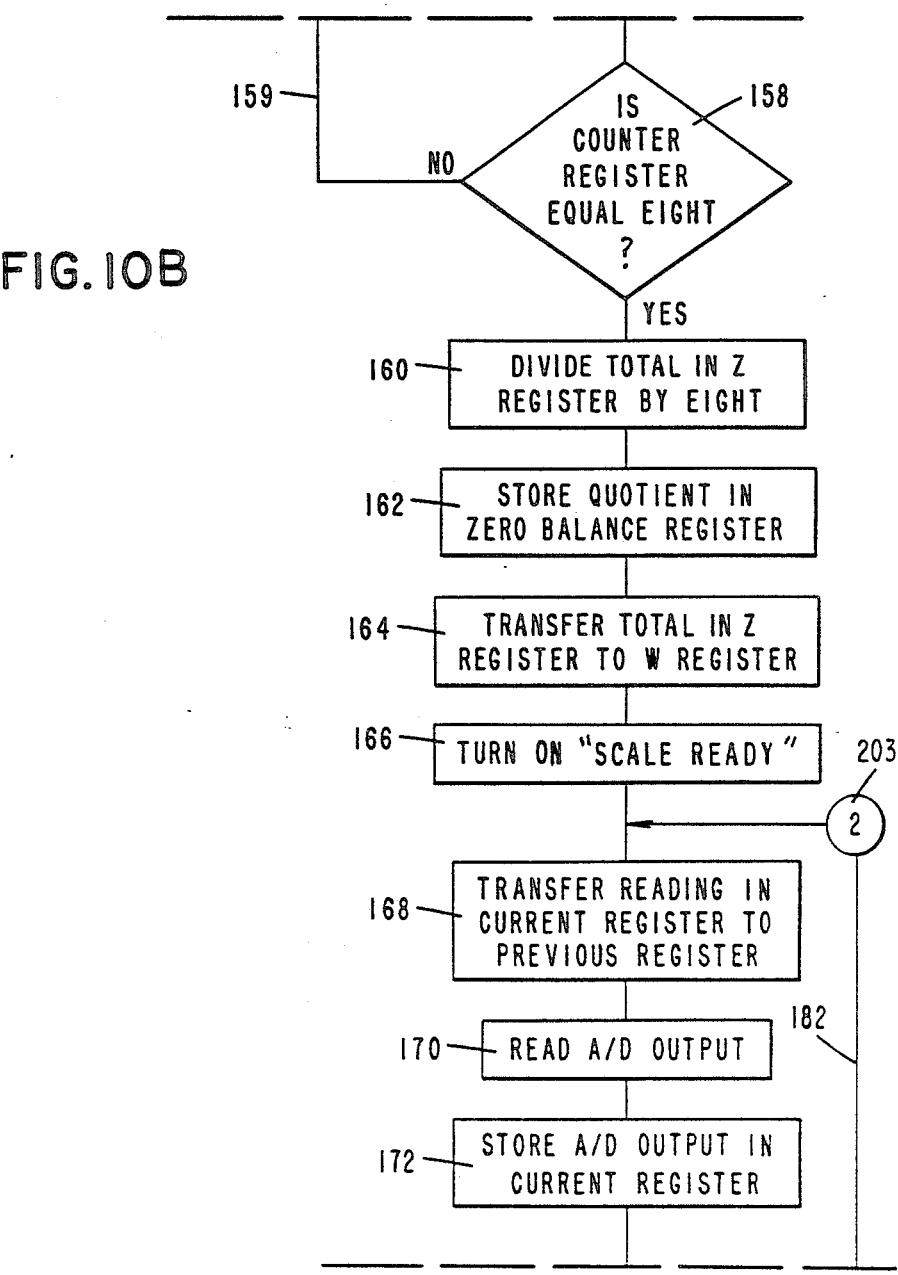

When the A/D converter readings fall within those limits, the microprocessor 60 will attempt to establish an average reading of the scale at zero weight by transferring the current A/D reading from the register 118 to the Z register 128 (FIG. 6) (block 154), increment the counter register 116 by one (block 156) and then check the output of the counter register 116 to see if it is equal to eight (block 158) (FIG. 10B). If the output of the counter register is not equal to eight, the processor returns over path 159 and again reads the output of the A/D converter 56 (block 146). This procedure is repeated until the number of readings stored in the Z register 128 equals eight, at which time the microprocessor divides the total of the readings stored in the Z register 128 by eight (block 160) to generate an average reading outputted by the A/D converter 56 (FIG. 2) when no weight is on the scale. The microprocessor then stores the quotient in the zero balance register 122 (FIG. 6) (block 162) and transfers the total in the Z register 128 to the W total register 129 (FIG. 6) (block 164). After this has occurred, the microprocessor enables the display 32 to turn on the logo "Scale Ready" 33 (FIG. 5) (block 166) and transfers the readings in the current A/D output register 118 (block 168) to the previous readings of the A/D converter stored in register 120. This step starts the zero balancing operation. The microprocessor then reads the output of the converter (block 170) and stores that output (block 172) in the current register 118.

Figure 10C:
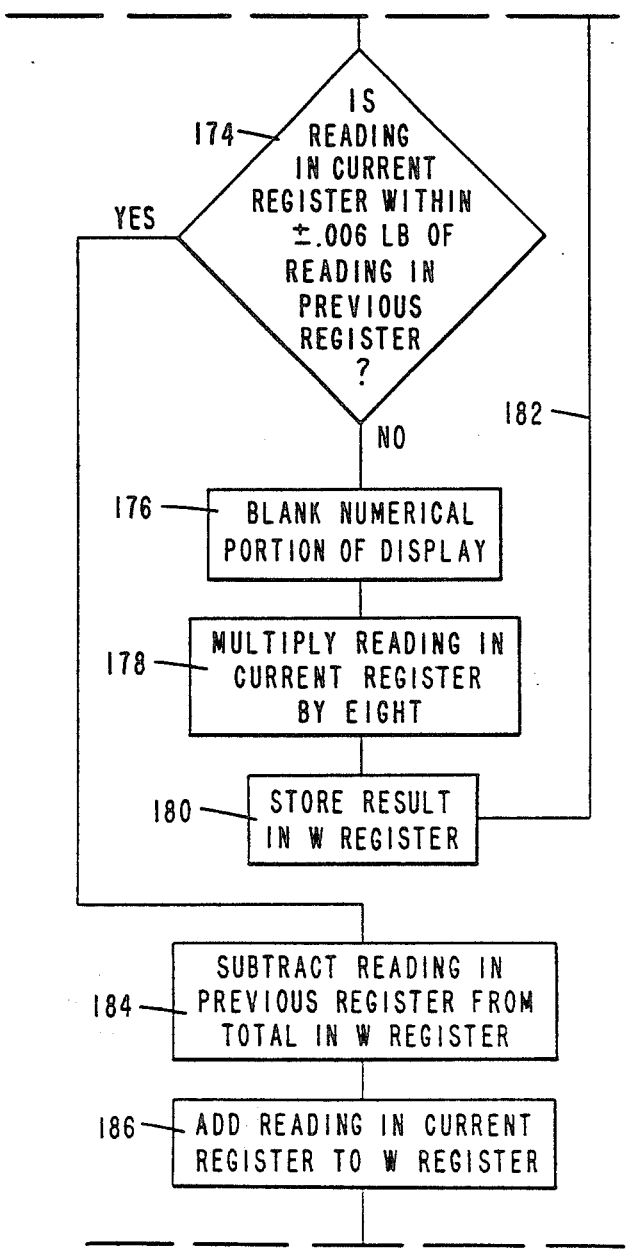
Figure 10D:
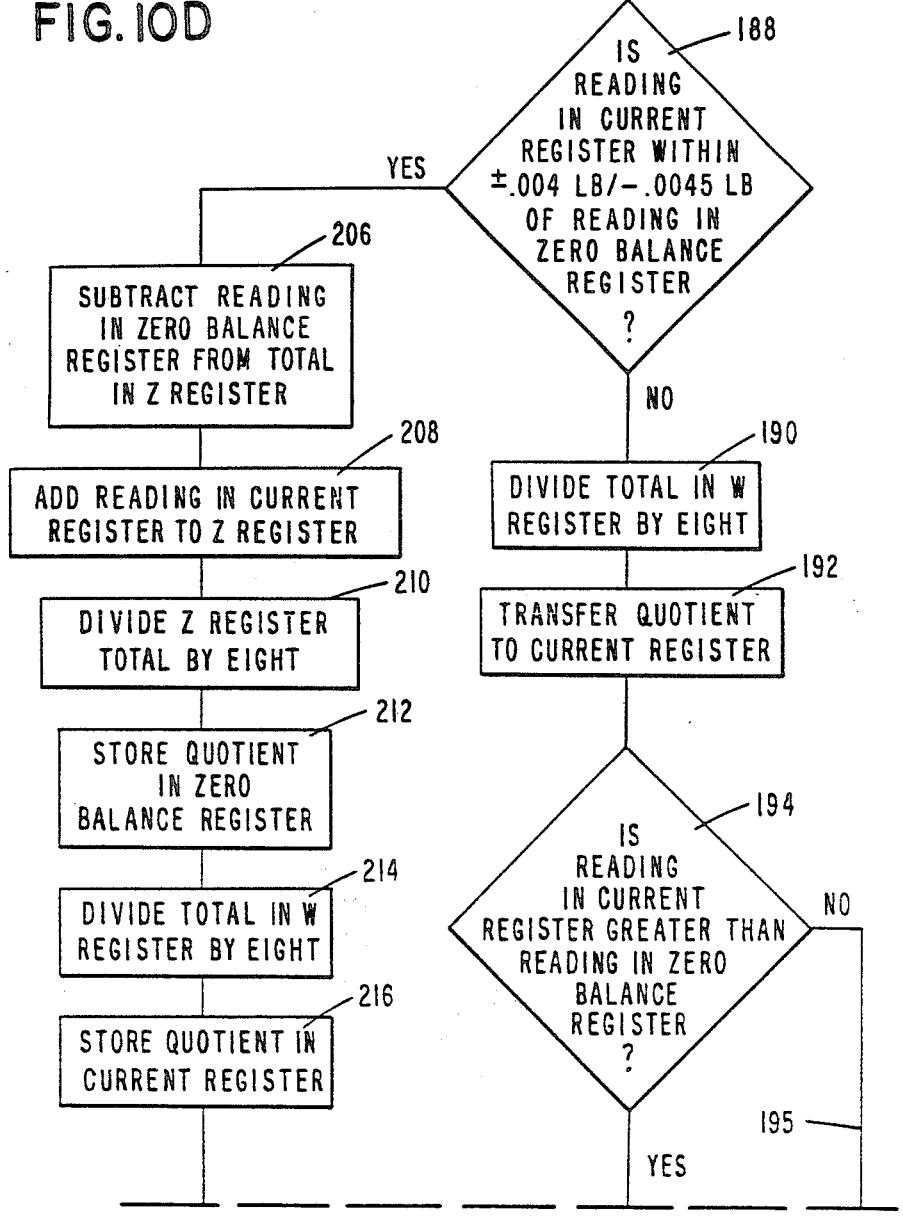

The microprocessor 60 then checks to determine whether the current reading of the A/D converter stored in the register 118 is within the limits of plus or minus 0.006 lbs. of the previous reading of the A/D converter stored in the register 120 (block 174) (FIG. 10C). If the current reading is not within the limits of plus or minus 0.006 lbs. (FIG. 8), which normally occurs when a weight is removed from the scale and the scale is returning to the zero state, the microprocessor will blank the numerical portion 29 (FIG. 4) of the display 32 (block 176), multiply the current A/D converter reading stored in the register 118 by eight (block 178) and transfer that result to the W total register 130 (block 180). The microprocessor 60 will then return over path 182 and repeat the steps of reading the output of the A/D converter (blocks 168–172) until two consecutive readings are within plus or minus 0.006 lbs. of each other. When this occurs, the microprocessor subtracts the last output reading (block 184) of the A/D converter from the total stored in the W register 129, adds the current A/D output reading stored in register 118 to the W register 129 (block 186) to establish that the average reading reflects the current output readings of the A/D converter 56. The microprocessor then compares (block 188) (FIG. 10D) the current A/D converter output reading stored in register 118 with the reading stored in the zero balance register 122 to establish that the scale reading are within acceptable limits of a valid zero reading. If the two readings are not within plus 0.004 lbs./minus 0.0045 lbs. of each other, the microprocessor will divide the total stored in the W total register 129 by eight (block 190) and transfer the result to the current register 118 (block 192).

The microprocessor attempts to establish the weight condition of the scale by comparing the reading stored in the current register 118 with the reading stored in the zero balance register 122 (block 194). If the current reading of the A/D converter 56 is equal to or less than the reading stored in the zero balance register 122, the microprocessor will follow path 195 and blank the display 32 (block 196) (FIG. 10E) and turn off the logo "Scale Ready" 33 (block 198) notifying the operator to remove the scale lid 26 from the scale 22 (FIG. 1) (block 200). At this time the microprocessor checks to see if the current A/D output reading is below the zero balance reading stored in the register 122 by −0.75 lbs. (FIG. 8) (block 202).

If the reading in the current register 118 is not below the zero balance reading, the microprocessor returns through the circled "2" symbol 203 to block 168 (FIG. 10B) and transfers the current A/D reading to the previous A/D reading register 120 and again samples the output of the A/D converter 56 until the readings are within plus or minus 0.006 lbs. of the previous A/D converter readings (block 174). If the current A/D reading (block 202) is below the zero balance readings stored in the zero balance register 122 by −0.75 lbs. (FIG. 8), the microprocessor will return through the circled "1" symbol 205 to block 140 (FIG. 10A) and initiate a reset operation by repeating the procedure for zero balancing the scale (blocks 140–194).

Figure 10E:
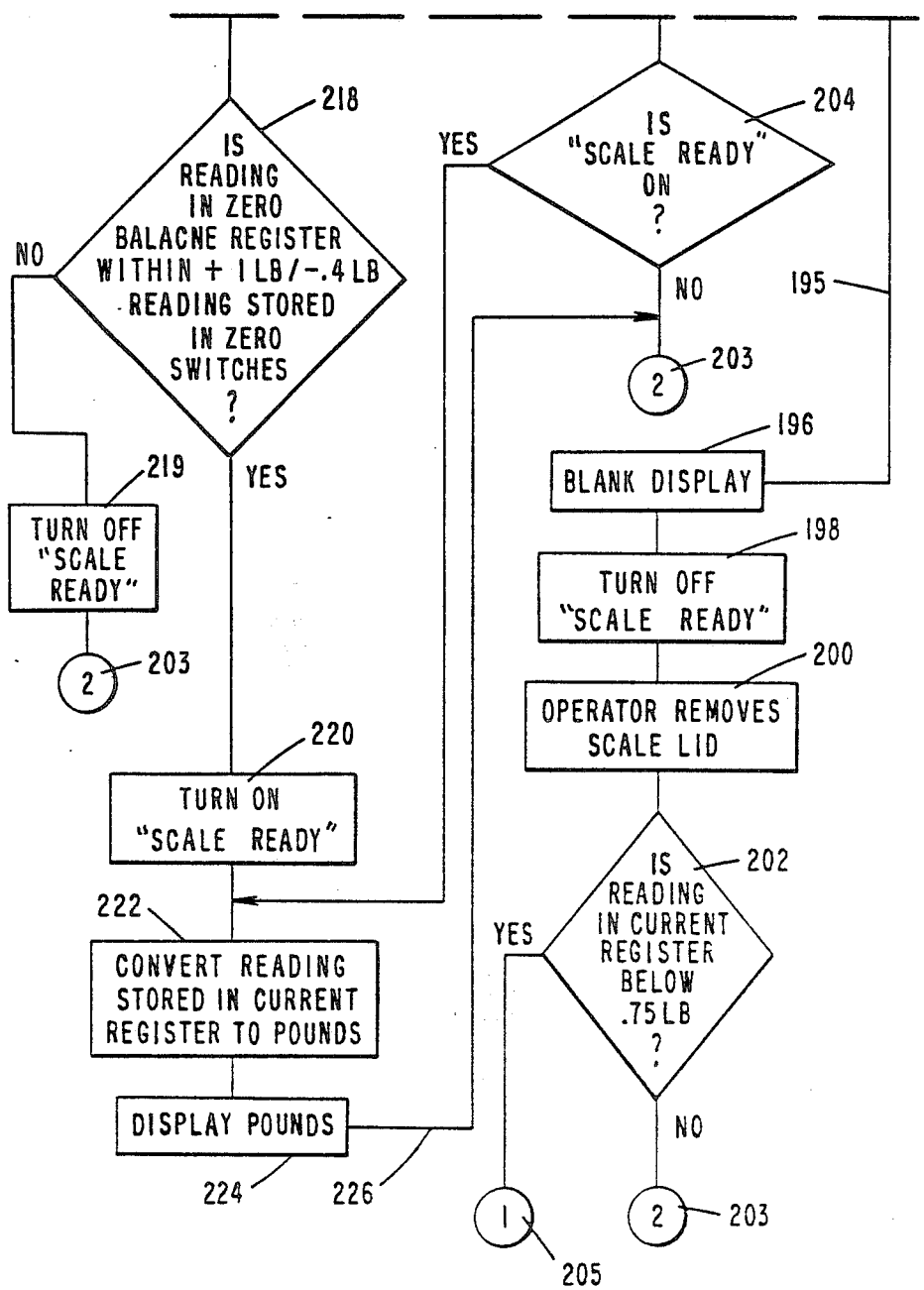

If the current A/D reading is greater than the reading stored in the zero balance register 122 (block 194) (FIG. 10D) the microprocessor will check to see if the logo "Scale Ready" 33 (FIG. 5) is on (block 204) (FIG. 10E). If it is not on, indicating that a weight cannot be put on the scale, the microprocessor will return through the circled "2" symbol 203 to block 168 (FIG. 10B) and transfer the current A/D reading stored in register 118 to the previous register 120 and repeat the zero balancing procedure until it samples a current reading from the A/D converter 56 which is within plus 0.004 lbs./0.0045 lbs. of the reading in the zero balance register 122 (block 188). If logo "Scale Ready" is on, it will convert the reading stored in its current register 118 to pounds (block 222) and display the pounds 31 (FIG. 5) (block 224).

When the microprocessor 60 obtains a reading from the A/D converter 56 which is within the above cited limits (block 188) (FIG. 10D), the microprocessor will update the zero balance of the scale by subtracting the reading in the zero balance register 122 from the total stored in the Z total register 128 (block 206), add the reading stored in the current register 118 to the Z total register 128 (block 208) and divide the total readings stored in the Z register 128 by eight (block 210). The microprocessor then stores the quotient in the zero balance register 122 (block 212), divides the total readings stored in the W total register 129 by eight (block 214) and stores the quotient representing the average reading outputted by the A/D converter 56 (FIG. 2) in the current register 118 (block 216). The microprocessor then compares (block 218) (FIG. 10E) the average reading stored in the zero balance register 122 with the reading stored in the zero calibration switches 130 in the switch banks 66c and 66d (FIG. 2), which readings are stored in the register 124 (FIG. 6).

If the reading stored in register 122 is not within plus 1 lb./−0.4 lbs. of the readings stored in the zero switches (block 218), the microprocessor 60 turns off the logo "Scale Ready" (block 219) and again return through the circled "2" symbol 203 to block 168 and transfers the readings stored in the current register 118 to the previous register 120. The microprocessor then takes readings from the A/D converter until the readings stored in the zero balance register 122 is within (block 218) plus 1 lb./−0.4 lbs. of the readings stored in the zero switches 130 in the switch banks 66c and 66d. When that occurs, the microprocessor will turn on the "Scale Ready" logo 33 (block 220), indicating that a scale operation can occur, converts the average reading in the current A/D converter register 118 to pounds (block 222) and displays the pounds in the display 32 (FIG. 5) (block 224) as part of the scale operation. The microprocessor will then return over line 226 and through the circled "2" symbol 203 to block 168 (FIG. 10B) wherein the microprocessor will again transfer the readings in the current register 118 to the previous register 120 and repeat the zero balancing procedure. During a weighing operation, the microprocessor 56 will continually check to see if the logo "Scale Ready" is on (block 204) (FIG. 10E). If it is, it will convert the reading stored in the current register 118 to pounds (block 222), display the weight in pounds (block 224) and return to block 168 for a zero balancing operation. It will thus be seen that the zero balancing operation is continuous throughout the operation of the scale.

While the salient features of the invention have been illustrated and described, it should be readily apparent to those skilled in the art that many changes and modifications can be made in the invention presented without departing from the spirit and, true scope of the invention. Accordingly, the present invention should be considered as encompassing all such changes in modifications of the invention that fall within the broad scope of the invention as defined by the appended claims.

What is claimed is:

1. In an electronic weighing system which includes a processor, a calibrated electronic scale having a lid for supporting a merchandise item, the scale outputting digital signals representing the weight of the merchandise item placed on the lid, a plurality of manually settable switches set to a position representing the value of the digital signals outputted by the scale when no weight is placed on the scale and a display controlled by the processor for displaying a logo indicating the scale is ready for a weighing operation, a method for automatically zero balancing the scale comprising the steps of:

performing a first sampling operation on the output digital sigtnals of the scale when no weight has been placed on the scale to generate first digital signals representing the weight on the scale;

comparing the first digital signals with the digital signals stored in the said settable switches;

periodically performing a second sampling of the output digital signals of the scale when the first digital signals are within a first predetermined value of the digital signals stored in the settable switches;

averaging the output signals of the scale generated by the second sampling to generate second digital signals representing the output digital signals of the scale when zero balanced;

enabling the display to display the logo in response to the generation of said second digital signals;

periodically performing a third sampling operation on the output of the scale to obtain third digital signals representing the weight on the scale;

comparing the value of the third digital signals with the value of the second digital signals;

disabling the displaying of the logo when the value of the third digital signals is less than the value of the second digital signals; and removing the lid of the scale to reset the weighing operation of the scale in response to the disabling of the displaying of the logo.

2. The method of claim 1, also including the steps of:

comparing the value of the third digital signals with the value of the first digital signals;

sensing if the display is displaying the logo when the value of the third digital signals is greater than the value of the first digital signals;

converting the value of the third digital signals to an equivalent weight when the display is displaying the logo; and displaying the equivalent weight on the display.

3. The method of claim 2, also includes the steps of periodically performing a fourth sampling operation of the output of the scale when the display is not displaying a logo to initiate a zero balancing operation of the scale.

4. The method of claim 1 in which the step of averaging the output of the scale periodically sampled includes the steps of:

storing the number of first digital signals generated as a result of the periodic sampling of the output of the scale;

dividing the total of the first digital signals generated by the number of times the output of the scale is periodically sampled to generate said second digital signals; and storing the second digital signals in a storage register.

5. The method of claim 1, also including the steps of comparing the value of the third digital signals with a negative weight value which is less than the value of the first digital signals and periodically performing a fourth sampling operation of the output signals of the scale when the value of the third digital signals is more than the negative weight value.

6. The method of claim 1, also including the steps of comparing the value of the third digital signals with a negative weight value which is less than the value of the first digital signals, disabling the display from displaying the logo when the value of the third digital signals is less than the negative weight value and initiating a zero balancing operation of the scale upon the disabling of this display.

7. The method of claim 1 in which the logo comprises "Scale Ready".

* * * * *

UNITED STATES PATENT AND TRADEMARK OFFICE
CERTIFICATE OF CORRECTION

PATENT NO.   : 4,751,661
DATED        : June 14, 1988
INVENTOR(S)  : Gene L. Amacher et al.

It is certified that error appears in the above-identified patent and that said Letters Patent is hereby corrected as shown below:

Column 8, line 61, delete "sigtnals" and substitute --signals--.

Signed and Sealed this

First Day of November, 1988

*Attest:*

DONALD J. QUIGG

*Attesting Officer*     *Commissioner of Patents and Trademarks*